(12) United States Patent
Charopoulos et al.

(10) Patent No.: US 12,137,840 B2
(45) Date of Patent: Nov. 12, 2024

(54) FOOD PREPARATION APPLIANCE WITH A DETACHABLE TOOL

(71) Applicant: Vorwerk & Co. Interholding GmbH, Wuppertal (DE)

(72) Inventors: Philipp Charopoulos, Düsseldorf (DE); Niklas van Teeffelen, Velbert (DE)

(73) Assignee: Vorwerk & Co. Interholding GmbH (DE)

( * ) Notice: Subject to any disclaimer, the term of this patent is extended or adjusted under 35 U.S.C. 154(b) by 162 days.

(21) Appl. No.: 17/836,230

(22) Filed: Jun. 9, 2022

(65) Prior Publication Data
US 2022/0304512 A1    Sep. 29, 2022

Related U.S. Application Data

(63) Continuation of application No. 16/279,505, filed on Feb. 19, 2019, now Pat. No. 11,395,563.

(30) Foreign Application Priority Data

Feb. 21, 2018  (EP) .................................... 18157752

(51) Int. Cl.
| | |
|---|---|
| *A47J 43/046* | (2006.01) |
| *A47J 43/07* | (2006.01) |
| *A47J 43/08* | (2006.01) |
| *B01F 27/808* | (2022.01) |
| *B01F 35/30* | (2022.01) |
| *B01F 35/31* | (2022.01) |
| *B01F 35/32* | (2022.01) |

(Continued)

(52) U.S. Cl.
CPC ......... *A47J 43/046* (2013.01); *A47J 43/0716* (2013.01); *A47J 43/085* (2013.01); *B01F 27/808* (2022.01); *B01F 35/31* (2022.01); *B01F 35/3213* (2022.01); *B01F 35/33* (2022.01); *B01F 2035/352* (2022.01); *B02C 18/12* (2013.01)

(58) Field of Classification Search
CPC .... A47J 43/046; A47J 43/0716; A47J 43/085; B01F 7/162
See application file for complete search history.

(56) References Cited

U.S. PATENT DOCUMENTS

| | | |
|---|---|---|
| 3,596,692 A | 8/1971 | Swanke |
| 3,786,999 A | 1/1974 | Cabell |

(Continued)

FOREIGN PATENT DOCUMENTS

| | | | | |
|---|---|---|---|---|
| CH | 00370537 A | | 7/1963 | |
| DE | 102018221207 A1 | * | 6/2020 | ............ A47J 43/044 |

(Continued)

*Primary Examiner* — Faye Francis
(74) *Attorney, Agent, or Firm* — Barnes & Thornburg LLP (57) ABSTRACT

The present disclosure relates to a food preparation appliance including a food preparation pot and a rotatable tool for chopping and/or blending a food in the food preparation pot wherein the tool is detachably connected to a shaft, which is at least partially outside the food preparation pot in order to be coupled to a drive for rotation. Further, a locking mechanism is provided for connecting the tool to the shaft in a locked manner. The locking mechanism is arranged in such a way that, during operation, the tool can be driven by the shaft in both rotation directions for chopping and/or blending a food.

17 Claims, 3 Drawing Sheets

(51) Int. Cl.
　　*B01F 35/33*　　　(2022.01)
　　*B02C 18/12*　　　(2006.01)

(56) References Cited

U.S. PATENT DOCUMENTS

| | | |
|---|---|---|
| 3,854,394 A | 12/1974 | Willsey |
| 4,817,878 A | 4/1989 | Shibata |
| 5,727,742 A | 3/1998 | Lawson |
| 6,375,102 B1 | 4/2002 | Bouleau et al. |
| 6,805,312 B2 | 10/2004 | Capp |
| 6,955,110 B1 | 10/2005 | Spletzer et al. |
| 8,529,118 B2 | 9/2013 | Davis et al. |
| 8,720,325 B2 | 5/2014 | Goncalves et al. |
| 8,944,357 B2 | 2/2015 | Conti et al. |
| 9,283,528 B2 | 3/2016 | Thai |
| 10,112,159 B2 * | 10/2018 | Liu ................ B01F 27/808 |
| 2002/0027175 A1 | 3/2002 | Capp |
| 2002/0176320 A1 | 11/2002 | Wulf et al. |
| 2013/0206771 A1 | 8/2013 | Arnold et al. |
| 2015/0083542 A1 | 3/2015 | Gelin et al. |
| 2016/0324391 A1 | 11/2016 | Lian et al. |
| 2017/0071413 A1 | 3/2017 | Park |
| 2018/0056254 A1 | 3/2018 | Liu |
| 2019/0246845 A1 | 8/2019 | Pan et al. |
| 2019/0254480 A1 | 8/2019 | Charopoulos et al. |
| 2020/0113389 A1 | 4/2020 | Chen |

FOREIGN PATENT DOCUMENTS

| | | | |
|---|---|---|---|
| GB | 2456045 | * | 7/2009 |
| WO | 2013049881 A1 | | 4/2013 |

\* cited by examiner

FOOD PREPARATION APPLIANCE WITH A DETACHABLE TOOL

PRIORITY CLAIM

This application is a continuation of U.S. Pat. No. 11,395,563, filed Feb. 19, 2019, which claims priority to European Application No. 18157752.9, filed Feb. 21, 2018, which application is hereby incorporated in its entirety herein.

FIELD OF THE DISCLOSURE

The present disclosure relates to a food preparation appliance comprising a food preparation pot and a rotatable tool for chopping and/or blending food in the food preparation pot. The tool can, for rotating, be detachably connected to a shaft, which is at least partially situated outside the food preparation pot in order to be coupled to a drive for rotation. A locking mechanism for connecting the tool to the shaft in a locked manner is provided.

BACKGROUND

There are food preparation appliances, such as food processors, in which a tool assembly with a rotatable knife assembly is inserted through an opening in the pot bottom and then locked, so that the opening is closed. In this case, the knife assembly is not intended for being removed from the tool assembly by the user. After food has been prepared, the food is therefore removed from around the knife assembly. The tool assembly can be detached from the pot and removed for cleaning. Liquid food waste may then flow through the opening.

In the case of the food processor Prep & Cook by Krups, a knife can be pushed onto a driving pin via a spiral guide in order to drive the knife for rotation by means of the driving pin. By means of this guide, however, the knife is radially and axially secured in only one rotation direction. Rotation in the direction not provided for would lead to the detachment of the knife. Therefore, there is only rotation direction.

SUMMARY

It is the object of the present disclosure to provide a refined development of a food preparation appliance and a refined development of a tool assembly.

A food preparation appliance according to the main claim and a tool assembly according to the independent claim serve for achieving the object. Advantageous embodiments are apparent from the dependent claims.

A food preparation appliance comprising a food preparation pot and a rotatable tool for chopping and/or blending food in the food preparation pot serves for achieving the object. The tool can, for rotating, be detachably connected to a shaft, which is at least partially situated outside the food preparation pot in order to be coupled to a drive for rotation. A locking mechanism for connecting the tool to the shaft in a locked manner is provided and arranged in such a way that, during operation, the tool can be driven by the shaft in both rotation directions for chopping and/or blending a food. During operation, i.e. particularly during the preparation of food, the tool always remains connected to the shaft in a reliably locked manner, even if the rotation direction is reversed. Thus, food can be prepared using both tool rotation directions, e.g. for preparing a dough. Then, the tool may be removed by the user, and the food may be removed without impediment from the tool.

In particular, the food preparation appliance includes a drive, which may substantially consist of an electric motor and a transmission unit. In one configuration, the electric motor is a reluctance motor. Operation in both rotation directions can be made possible in a particularly reliable manner by a reluctance motor. A reluctance motor generally comprises a stationary winding as a stator and a rotating iron with radial projections as a rotor. In operation, the rotation direction can be reversed during the preparation process, in particular at the push of a button. Preferably, the shaft can be detachably coupled to the drive by the user so that the motor rotates the shaft and the shaft the tool. Basically, a shaft is a cylindrical rotary body. A shaft has an axis of rotation. Preferably, the shaft and the tool have the same axis of rotation. A shaft may have one or more shaft shoulders, for example for a ball-bearing seat or as a shielding means. A shaft which is situated at least partially outside the food preparation pot preferably extends through a pot through-hole from the outside into the interior or in the direction of the interior of the food preparation pot. Preferably, a sealing member is provided between the pot through-hole and the shaft, so that no liquid escapes from the interior of the food preparation pot through the pot through-hole towards the outside.

Preferably, the tool is rotatable about an axis of rotation. In particular, particularly high rotary speeds of the tool of at least 5,000 rpm, preferably, for example, 10,000 rpm, can be reached. Preferably, the tool has one or more radial tool arms, e.g. stirring arms for blending, blades for chopping, or knives or mixing knives for blending and chopping. In particular, the at least one tool arm is firmly attached to a bracket of the tool. For a locked connection with the tool, the shaft may preferably be connected in a locked manner directly to the bracket or a coupling pin of the tool. The coupling pin may be integrally formed with the bracket or non-rotatably connected thereto, in particular in such a manner that the connection is not intended or configured for being detached by the user.

Preferably, the food preparation appliance is a food preparation device, such as an electric food processor, preferably with a heating member for heating the food in the food preparation pot. In principle, the food preparation appliance may also be an oven or cooking machine. During operation, food and/or an ingredient is inserted into the food preparation pot, and the food is prepared in the food preparation pot. Preparing a food means processing by means of blending, chopping and/or heating. Food may be solid or liquid.

In one embodiment, the food preparation pot comprises a pot through-hole for connecting the tool to a drive, in particular in a pot bottom of the food preparation pot. During operation, the tool can thus be disposed particularly close to the drive and be rotated at particularly high rotary speeds. In particular, the pot through-hole is situated distant from or opposite to an opening of the food preparation pot that serves for adding ingredients or removing the food. Normally, the opening is disposed on the top side of the food preparation pot and may optionally be covered by a lid. In contrast, the pot through-hole extends, in particular, through the pot bottom, preferably in the center of the pot bottom. Thus, a particularly uniform blending and/or chopping of a food by the tool can be made possible.

In one embodiment, it is provided that the shaft, in order to seal the pot through-hole, can remain connected to the food preparation pot when the tool is detached and removed from the shaft. The detachment of the tool from the shaft relates to the disengagement of the locked connection between the tool and the shaft. Thus, foods like mashed potatoes or ice cream can be removed particularly easily and completely, and the food preparation pot can be cleaned with particularly little effort. Subsequent to the disengagement of the locked connection, the tool may be lifted and thus removed from the shaft. After the tool has been taken out of the food preparation pot, leftover food may be gathered unimpededly at the pot bottom, e.g. by means of a spatula, and removed. If the tool includes knives, damage to the spatula can be avoided by removing the tool. At the same time, access to the pot bottom is no longer partially blocked by radial tool arms.

In particular, an upper part with the tool is detached and removed from a lower part with the shaft, so that the upper part no longer covers the pot bottom for removing the prepared food and the food preparation pot or the pot through-hole remains sealed because of the lower part remaining in place.

A tool assembly, which constitutes a discrete aspect of the present disclosure and is provided for a food preparation appliance described in the introduction, substantially consists of an upper part and a lower part. The upper part has a rotatable tool for chopping and/or blending food in a food preparation pot. The lower part comprises a shaft for rotating the tool, which may at least partially be situated outside the food preparation pot in order to be coupled to a drive for rotation. The tool can be detachably connected to the shaft for rotation. A locking mechanism for connecting the tool to the shaft in a locked manner is provided and arranged in such a way that, during operation, the tool can be driven by the shaft in both rotation directions for chopping and/or blending a food. The following embodiments not only relate to the food preparation appliance for achieving the object stated in the introduction, but may also relate to this tool assembly.

In one embodiment, a lower part comprises the shaft. Thus, the pot through-hole can be sealed particularly reliably even at high rotary speeds. In an alternative or additional embodiment, the shaft is rotatably connected to a lower-part housing of the lower part. A lower-part housing reliably permits a rotatable mounting of the shaft, preferably by means of a ball bearing. In particular, the shaft is connected to the lower-part housing in a rotatable and axially fixed manner, particularly by means of said ball bearing. Due to being axially fixed, e.g. by means of a press fit, the shaft, together with the lower-part housing, always contributes to sealing the pot through-hole when the lower part is inserted into the pot through-hole or tightly connected thereto. After food has been prepared and the upper part has been detached from the inserted lower part, it can thus be prevented that the user pushes the shaft out of the lower part or is able to detach it in another manner, which would result in the food preparation pot leaking.

In one embodiment, an upper part comprises the tool. The tool, which substantially consists, for example, of radial tool arms and a bracket for the radial tool arms, can thus be operated in a particularly reliable and low-vibration manner, even at high rotary speeds. Furthermore, the tool, by means of the upper part, can then be particularly conveniently interlocked with the shaft by the user. In an alternative or additional embodiment, the tool is rotatably connected to an upper-part housing of the upper part. An upper-part housing reliably permits a rotatable mounting of the tool, preferably by means of a ball bearing. In particular, the tool is connected to the upper-part housing in a rotatable and axially fixed manner, particularly by means of said ball bearing. By axial fixing, which is generally not intended or configured for disengagement by the user, a particularly robust locked connection of the tool to the shaft, even at high rotary speeds, can be obtained. The top-part housing is advantageous with respect to the dynamics of the tool.

In one embodiment, the lower part and the upper part are configured such that the tool is connected to the shaft in a locked manner by the upper part being connected to the lower part in a locked manner. Accordingly, the lower part and the upper part are configured such that the tool connected in a locked manner can be detached from the shaft by the upper part being detached from the lower part, or the upper-part housing from the lower-part housing. Comparatively large handling grips for the user may thus be provided for locking and detaching, i.e. unlocking, in a particularly comfortable manner. Axial locking means on the tool or the shaft, and thus possible troublesome centrifugal forces and imbalances can thus be avoided. Particularly high rotary speeds can thus be made possible in a particularly reliable manner.

In one embodiment, the lower part can be inserted into the pot through-hole and/or connected to the food preparation pot in such a way that the pot through-hole is sealed by the lower part. "Sealing" means water-tight. Thus, the tool can be detached and removed from the shaft or the lower part without the food preparation pot becoming leaky with respect to liquid, due to the pot through-hole. Therefore, a particularly high degree of ease of use can be achieved. In one configuration, a sealing member for producing a sealed connection is provided between the lower part and the food preparation pot in the region of the edge of the pot through-hole. The sealing member is preferably disposed between the lower-part housing and the pot bottom and/or an inner contour of the pot bottom delimiting the pot through-hole.

In one configuration, the sealing member is a static sealing member, which is not intended or configured for being replaced, dismantled, mounted, removed or inserted by the user. Rather, a static sealing member is intended for a permanent use in the mounted state. Thus, a particularly good tightness and long life can be achieved. In principle, the food preparation pot may include the sealing member. Preferably, however, the lower part comprises the sealing member. In one configuration, the sealing member contains an elastic material, preferably a rubber-elastic material, particularly preferably an elastomer, or consists of it. In particular, the sealing member includes silicone. Preferably, the sealing element is ring-like. Alternatively, it is possible, in principle, to use a sealing member intended and configured for being replaced by the user.

In one configuration, the food preparation pot and the lower part are configures such that the lower part is permanently inserted into the pot through-hole. Dismantling the lower part from the food preparation pot by the user, e.g. for cleaning purposes, is not intended in this configuration and not possible without a tool as a matter of principle. Thus, the escape of food or liquid from the food preparation pot through the pot through-hole can be permanently prevented. At the same time, the tool can be detached and removed for removing food or cleaning the tool. Also in this configuration, a tool assembly with the upper part and the lower part may be a separate unit from the food preparation pot, which may be replaced in the food preparation pot as a spare part by a specialized company.

In one embodiment, the lower part can be inserted into the pot through-hole and/or connected to the food preparation pot in such a way that the lower-part housing can be connected to the food preparation pot in an axially fixed and/or non-rotatable manner. Thus, a low-vibration operation of the tool is made possible even at high rotary speeds.

In one configuration, the lower-part housing has at least one radial projection which, in the state inserted of being into the pot through-hole, reaches into a radial recess of the inner contour that delimits the pot through-hole. A non-rotatable fixing is thus made possible with a particularly simple and reliable design. The inner contour is a part of the food preparation pot, in particular of the pot bottom. The radial projection is a part of the circumferential outer contour of the lower-part housing which, in the inserted state, is located at the level of the inner contour. In particular, the outer contour and/or the inner contour have an, in particular mutually corresponding, non-symmetric cross-sectional shape, preferably a star-like cross-sectional shape. In particular, several radial projections of the outer contour and/or several radial recesses of the inner contour are circumferentially evenly distributed.

In one configuration, on at least one radial projection, another radial projection is provided that is offset in an axially downward direction. The further projection is located, in particular, below the pot bottom and/or forms, together with the projection, an annular peripheral groove on the circumference of the lower-part housing. The groove formed in this way may be used for clamping the lower part or the lower-part housing to an underside of the food preparation pot so that the lower-part housing is pressed against the pot bottom from below. A particularly robust retention of the lower part in the pot through-hole in the inserted state or a particularly robust connection to the food preparation pot can thus be obtained.

In one embodiment, the upper-part housing, for connecting the tool to the shaft in a locked manner, is locked to the lower-part housing in an axially fixed and/or non-rotatable manner. Thus, the tool can be automatically connected to the shaft in a locked manner if the upper-part housing is axially interlocked with the lower-part housing. A user-friendly locking action is thus made possible, because handling the upper part as opposed to the tool is easier. Due to the non-rotatable connection, the upper-part housing can be prevented from rotating along with the tool, for example due to friction in the ball bearing.

In one embodiment, an engaging recess and a movable locking member for engagement with the engaging recess are provided for axial locking. An interlocking of the upper part with the lower part or of the upper-part housing with the lower-part housing can thus be implemented with a particularly simple design and in a convenient manner for the user. Preferably, locking is carried out by clamping and/or an engagement. In particular, the lower-part housing comprises the engaging recess, and/or the upper-part housing comprises the locking member. Alternatively or in principle, it is also possible that the upper-part housing comprises the engaging recess and/or the lower-part housing comprises the locking member. In particular, a guide or a stop is provided which restricts the locking member in the axially locked state, i.e. in the engaging position, a displacement in the circumferential direction. If a torque greater than the static friction acts on the axial engaged connection, a displacement in the circumferential direction can be prevented and thus a particularly reliable and robust operation ensured, by the guide or the stop.

In one configuration, the locking member is a drop bolt, a locking bolt, a locking lever, a fixing clamp or a barb. Locking with particularly few manual steps is thus made possible. Preferably, the locking mechanism is a clip closure, a hooking lock or a snap closure.

In one embodiment, the locking member is biased by a spring. Thus, the locking member is spring-biased. It can thus be achieved that the locking member is particularly reliably secured in the engaging position relative to the engaging recess. In an alternative or additional embodiment, the engaging recess is formed by an undercut contour. It is thus possible to obtain a particularly reliable engaged connection. "Undercut contour" relates to the axial direction. For locking, the locking member reaches axially behind the undercut contour so that the locking member engages with the engaging recess. In the engaged state, the locking member is prevented from moving back to disengage the engaged connection.

In one embodiment, for engaging the locking member with the engaging recess, the locking member is manually deflected against the spring bias and is moved into a coupling position relative to the engaging recess. The locking member is only able to reach the coupling position, that is, pass the undercut contour, for example, if the locking member is manually deflected against the spring bias. Alternatively or additionally, the locking member is moved from the coupling position into an engaging position by the spring bias. In the engaging position, the locking member engages with the engaging recess, i.e. the locking member is engaged behind the undercut contour. The engagement with the engaging recess, e.g. by engagement with the undercut contour, thus takes place by the spring-biased and deflected locking member being released. In one configuration, the locking member is rotatably mounted on one end or in the center, and/or the locking member pivots from an initial position into the coupling position, in particular radially, preferably radially in the direction of the axis of rotation of the shaft. In an alternative or additional configuration, the locking member is guided in a linearly moveable manner, in particular radially and/or perpendicularly to the axis of rotation of the shaft. Preferably, a locking member guided in a linearly movable manner has a dovetail-like, trapezoidal and/or wedge-shaped profile in the direction of movement. In one configuration, the initial position is defined by a stop contour against which the locking member is moved and pressed by the spring bias if the locking member is released and not operated by the user. In one configuration, the spring is a compression spring or torsion spring, preferably a coil spring. In an alternative or additional configuration, the locking member is configured in such a way that the locking member can be bent or curved in a spring-like, elastic manner, and/or the locking member generates the spring bias itself in the case of a manual deflection by elastic bending or curving. An additional spring may thus be saved. In particular, the locking member has a handle for the user.

In one embodiment, the tool is non-rotatably connected to a coupling pin, wherein the coupling pin can be positively connected in a non-rotatable manner to the shaft, preferably directly, in order to connect the tool to the shaft in a locked manner. Thus, leftovers are particularly easy to remove, without a shaft protruding from the pot bottom interfering. The upper part comprises the coupling pin. The coupling pin may be integrally formed with the bracket for the tool arms or connected thereto in an axially fixed and non-rotatable manner, in particular non-detachably by the user. Alternatively, the shaft can be positively connected in a non-rotatable manner to the tool or the bracket for the tool arms, but in that case such that it can be detached by the user by disengaging the upper part from the lower part. In one configuration, the coupling pin is rotatably mounted in the upper-part housing by means of a ball bearing.

In one embodiment, the tool, in the state of being connected to the shaft in a locked manner, is positively connected in a non-rotatable manner to the shaft. A particularly simple coupling process for an interlock, e.g. by merely fitting the upper part onto the lower part and interlocking them, can thus be made possible.

In one configuration, a positively non-rotatable connection is realized by means of a multi-edged profile, preferably a quadrilateral or star-like profile, and a corresponding counter-contour.

Another aspect of the present disclosure relates to a tool assembly or a food preparation pot comprising a tool assembly for the above-described food preparation appliance, wherein the tool assembly substantially consists of an upper part and a lower part. The upper part has a rotatable tool for chopping and/or blending food in a food preparation pot. The lower part comprises a shaft for rotating the tool, which may at least partially be situated outside the food preparation pot in order to be coupled to a drive for rotation. The tool can be detachably connected to the shaft for rotation. A locking mechanism for connecting the tool to the shaft in a locked manner is provided and arranged in such a way that, during operation, the tool can be driven by the shaft in both rotation directions for chopping and/or blending a food. The above-described embodiments also relate to the food preparation pot or the tool assembly of the aspect of the present disclosure described in this paragraph.

Exemplary embodiments of the present disclosure will be explained below in more detail, also with reference to Figures. Features of the exemplary embodiments and other alternative or supplementary configurations described hereinafter may be combined individually or in plurality with the claimed subject matters. The claimed scopes of protections are not limited to the exemplary embodiments.

DETAILED DESCRIPTION

FIGS. 1, 2, 3, and 4 show different exemplary embodiments comprising a rotatable tool 2 for chopping and/or blending a food above a pot bottom 5 in a food preparation pot 1, which normally extends in a cylinder-like manner from the side edge of the pot bottom to a top side, which can optionally be covered by a lid and serves for adding and removing food. The tool 2 belongs to a first sub-assembly, hereinafter referred to as upper part 22. In the Figures, the tool 2 is shown in a state of being connected to the shaft 3 in a locked manner. The shaft 2 is situated outside, or at least with a portion outside, the food preparation pot 1. The shaft 3 belongs to a second sub-assembly, hereinafter referred to as lower part 21. Together, the upper part 22 and the lower part 21 form a tool assembly 20. As is illustrated, the tool assembly 20 can be connected to the food preparation pot 1, in particular by inserting the lower part 21 into the pot through-hole 4 extending coaxially with the axis of rotation 11 of the tool 2 and the shaft 3, which is oriented perpendicular to the pot bottom 5. The shaft 3 has a coupling end 12 which is formed in a rotationally non-symmetric, in particular star-like, manner, in order to be coupled to a drive for rotation, which is not shown. The coupling end 12 can be coupled to the drive in particular by inserting the food preparation pot 1 into a receiving portion, which is not shown, of the food preparation appliance with the drive. The removal of the food preparation pot 1 from the receiving portion then automatically results in the coupling end 12 being detached from the drive. The upper part 22 has an upper-part housing 7 with a ball bearing 13 for rotatably mounting a coupling pin 10 of the upper part 22. In the upper region, the coupling pin 10 is connected to a bracket 15 for radial tool arms 16 in an axially fixed and non-rotatable manner, preferably so as not to be detachable without damage, e.g. by means of a rivet and screw connection, which is not shown, or by substance-to-substance connection. The tool arms 16 preferably include a blade. At the lower end, the coupling pin 10 has a depression, which is, in particular, not rotationally symmetric, for a positive, non-rotatable connection 17 with a correspondingly, protruding counter-contour, which is not rotationally symmetric, of the upper end of the shaft 3. The shaft 3 is rotatably mounted with the lower-part housing 6 of the lower part 21 via a different ball bearing 14.

In the exemplary embodiment of the FIGS. 1 and 2, insertion and water-tight sealing of the pot through-hole 4 by the lower part 21 is realized as follows. The sealing member 18 is pushed from below onto the outer jacket surface 24 of the lower-part housing 6 up to a radial shoulder 23, hereinafter referred to as upper radial shoulder 23, as the upper stop for the sealing member 18. The lower part 21 is inserted into the pot through-hole 4 from above. In particular, a further sealing member 19 is pushed from below onto the outer jacket surface 24 of the lower-part housing 6. For this purpose, the further sealing member 19, while expanding elastically, can be elastically pushed over a further radial shoulder 25, hereinafter referred to as lower radial shoulder 25, which is, in particular, peripherally extending or annular. Having passed the lower radial shoulder 25, the further sealing member 19 contracts again and is axially supported in a positive manner by the lower radial shoulder 25, so that a clamping force on the pot bottom can be generated between the two sealing members. Thus, the pot bottom 5 can be sealed in a water-tight manner by the two sealing members 18, 19. Alternatively or additionally, the further sealing member 19 may already be preassembled with the lower-part housing 6 and, when the lower part is inserted into the pot through-hole 4, be elastically deformed in such a way that the further sealing member 19 is urged through the pot through-hole 4 when being inserted from above and elastically expands to the original form after passing through the pot through-hole 4, so that the pot bottom 5 is clamped between the two sealing members 18, 19. In the case of the further sealing member 19, a projection serves 26 for clamping the pot bottom 5 from the underside. The projection 26 covers a further projection 27 disposed axially thereunder at a distance, which together form a groove 28 in the circumferential direction. The groove 28 formed in this way may be used for clamping the lower part 21 or the lower-part housing 6 to the underside of the pot bottom 5 so that the lower-part housing 6 is pressed against the pot bottom from below. Such a groove 21 in the circumferential direction is implemented, in particular, also in the exemplary embodiment of FIG. 3, but not visible in the longitudinal section. A particularly robust retention of the lower part 21 in the pot through-hole 4 in the inserted state can thus be obtained.

Figure 3:
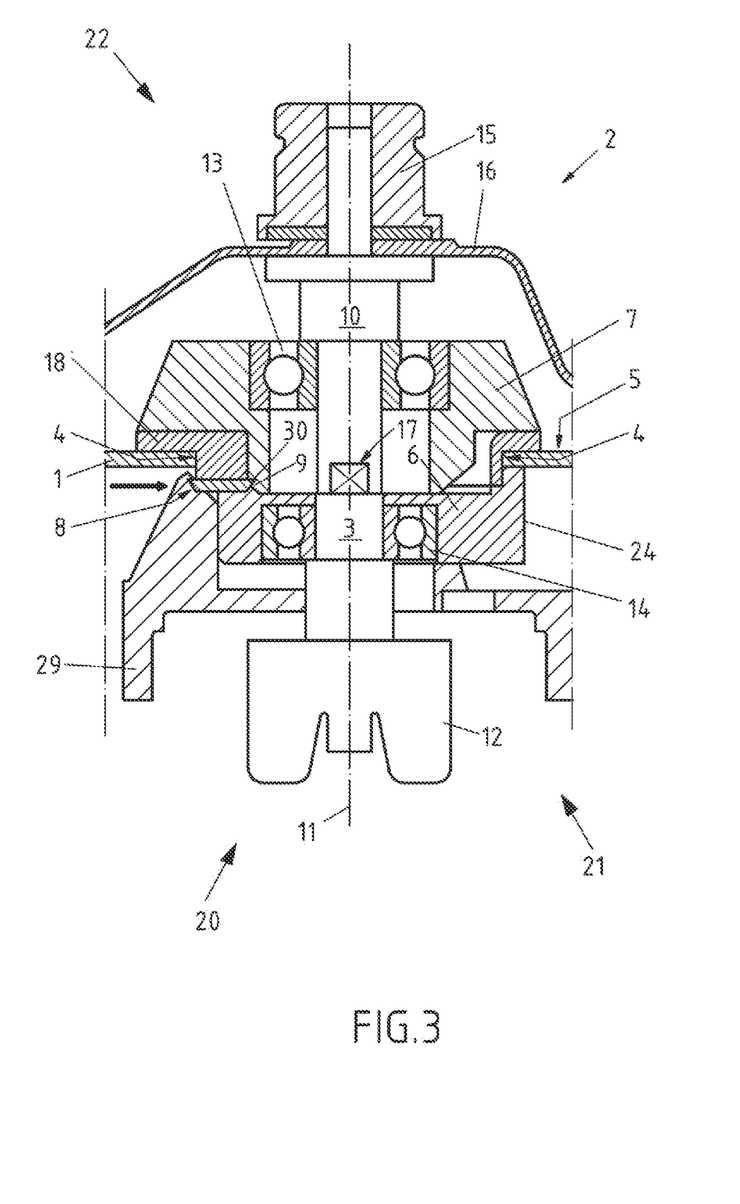
FIG. 3: shows a schematic illustration of a third exemplary embodiment in a longitudinal section.
Figure 4:
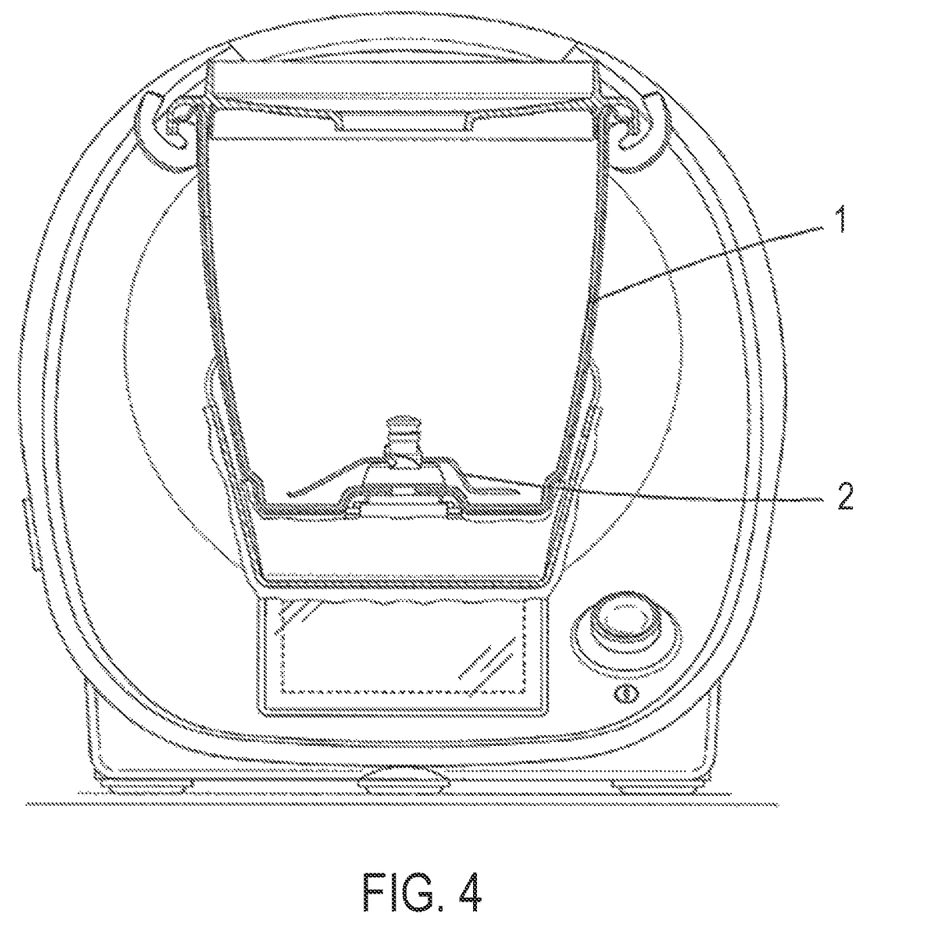
FIG. 4: shows a schematic illustration of an exemplary embodiment of a food preparation pot.

In the exemplary embodiment of FIG. 3, the sealing member 18 can be inserted into the pot through-hole 4 from above, particularly in such a way that, in the mounted state, a compressive force is permanently exerted radially from the inside against the inner contour of the pot through-hole 4. In the state of being connected in a locked manner, the sealing member 18 is axially clamped between the upper part 22 or the upper-part housing 7 and the pot bottom 5 and the lower part 21 or the lower-part housing 6. Thus, the sealing effect is additionally increased.

Figure 1:
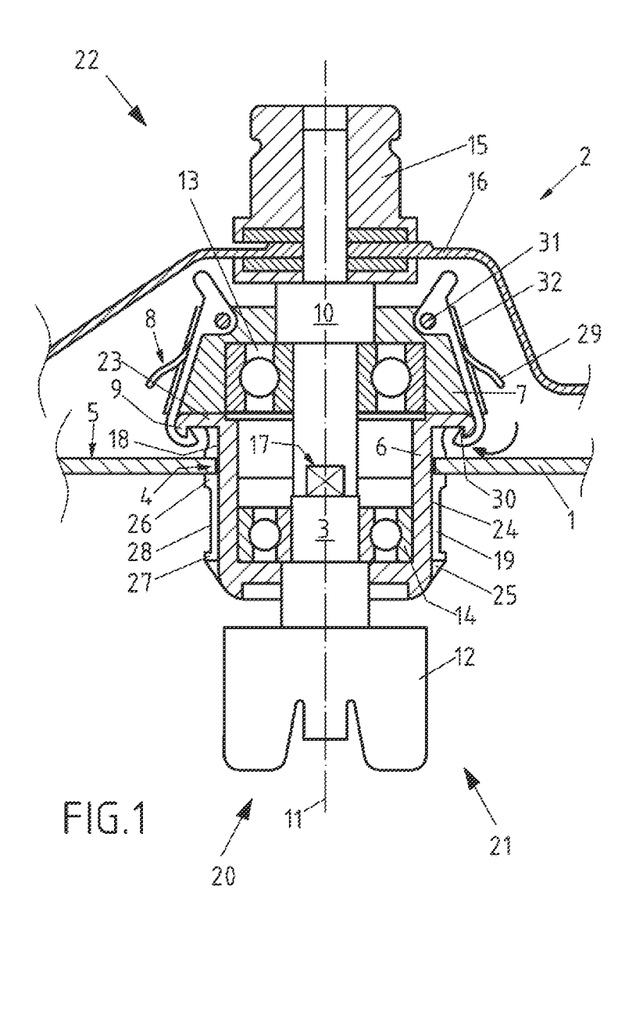
FIG. 1: shows a schematic illustration of a first exemplary embodiment in a longitudinal section, with a tool which, in operation, can be driven in both rotation directions and is connected to the shaft in a locked manner.
Figure 2:
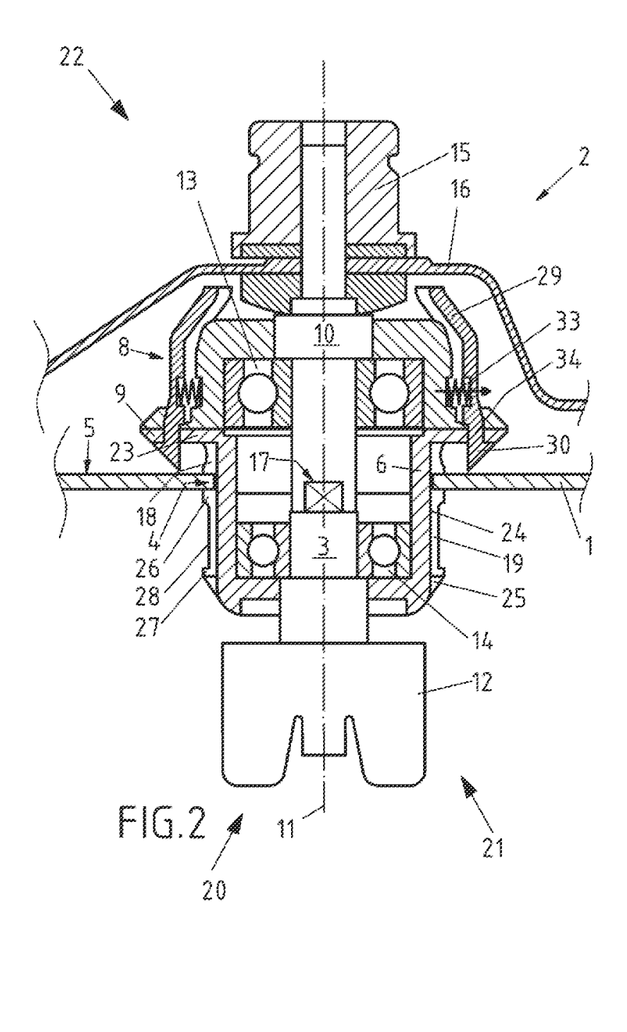
FIG. 2: shows a schematic illustration of a second exemplary embodiment in a longitudinal section.

In the exemplary embodiments of the FIGS. 1, 2 and 3, the outer jacket surface 24 of the lower-part housing 6, which is preferably shaped in a star-like manner, together with the circumferentially adjacent sealing member 18 forms a closed, tight and positively non-rotatable connection of the lower part 21 or the lower-part housing 6 to the pot bottom 5. The inner contour of the pot through-hole 4 has a counter-contour corresponding thereto.

In the exemplary embodiment of FIG. 1, a movable locking member 8, preferably two mirror-symmetrical locking members 8, is provided in the form of a locking lever which is mounted in a radially pivotable manner on the preferably trapezoidal upper-part housing 7. Preferably, the pivot bearing 31 of the locking member 8 is located at the upper end. An engaging contour 30 for engaging an undercut contour of an engaging recess 9 is located at the lower end of the locking member 8 in order to engage, i.e. interlock, the locking member 8 with the engaging recess 9. In particular, the locking member 8 is biased by a spring, which is not shown, for pivoting radially outwards. In particular, the engaging recess 9 is situated at the outer edge of the radial shoulder 23. After the user has placed the upper part 22 on the lower part 21, the user can pivot the locking member 8 downwards by means of a handle 29 until the locking member 8 hits the engaging recess 9. In order to ride over the engaging recess 9 in the shape of an undercut contour in an axial and radially inward direction, the user presses the handle 29, which in particular protrudes radially from the center of the locking member 8, and is thus able to cause an elastic deflection of the locking member 8 in the form of an elastic deformation or curving. The distance from the engaging contour 30 to the pivot bearing 31 is increased by the curving. Once the locking element 8 is sufficiently curved to override the undercut contour, the locking element moves from the coupling position behind the undercut contour. The locking member 8 is elastically deformed back into its original shape. The engaging contour 30, which is, in particular, hook-shaped, thus engages behind the undercut (indicated in FIG. 1 by an arrow) and thus ends up in the engaging position. The locking member 8 is then axially interlocked with the engaging recess 9. A guide 32 prevents circumferential displacement. For detaching or unlocking, the user pulls the handle 29 radially outwards and thus again deforms the locking member 8 elastically until the engaging contour 30 becomes detached from the undercut and the locking member 8 is disengaged from the engaging recess 9. Then, the upper part 22 with the tool 2 can be lifted off the lower part 21.

In the exemplary embodiment of FIG. 2, a movable locking member 8, preferably two mirror-symmetrical locking members 8, is provided in the form of a drop bolt, which is biased radially outwards in the direction of the arrow by a spring 33, in particular a coil spring. When the upper part 22 is placed on the lower part 21, the user simultaneously keeps the two opposite locking members 8 pushed radially inwards in the direction of the axis of rotation 11. Thus, the locking members 8 are able to pass corresponding openings 34 in the lower-part housing 6. In particular, the openings 34 are disposed in an end region of the radial shoulder 23 and/or are formed by an undercut contour of the engaging recess 9. When the engaging contour 30 has passed the undercut contour and the coupling pin 10 is connected to the shaft 3, the user releases the locking members 8, so that the locking members 8 move from the coupling position behind the opening or the undercut into the engaging position and thus engage. In order to detach and remove the tool 2 from the shaft 3, the locking member 8 are radially brought by the user into the coupling position against the spring bias and moved upwards. Thus, the upper part 22 can be removed from the lower part 21.

In the exemplary embodiment of FIG. 3, the locking member 8 has, in particular, a trapezoidal or wedge-shaped profile. In particular, only one locking member 8 is provided. Preferably, the locking member 8 can be moved in a laterally guided manner relative to the profile, or the handle 29 can be brought into engagement, laterally, with the locking member 8. In particular, the locking member 8 and/or the handle 29 can be manually moved and/or spring biased radially (in the direction of the arrow). In one configuration, the locking member 8 can be moved back and forth between a coupling position and an engaging position by the handle 29. In an alternative configuration, the locking member 8 is non-movably connected to the upper-part housing 7, and the handle 29 can be moved back and forth between a coupling position and an engaging position. In this alternative embodiment, the engaging contour 30 and the engaging recess 9 are disposed on the handle 29 or the undercut of the locking member 8, in contrast to FIG. 3. In both configurations, the spring bias acts from the coupling position in the direction towards the engaging position, which is shown in FIG. 3. In the coupling position, the upper part 22 can be fitted onto the lower part 21 or removed therefrom. In the engaging position, the upper-part housing 7 can be interlocked with the lower-part housing 6 by engaging the engaging recess 9 in the form of an axial undercut with the engaging contour 30. For disengaging and/or locking, the handle 29 can be operated by rotating, pulling and/or pushing in order to alternate between the coupling position and the engaging position. The engaging contour 30 can thus be detached by the handle 29 from the engaging recess 9, so that the upper part 22 can be removed from the lower part 21. In particular, the handle 29 below the pot bottom 5 can be operated by the user. Preferably, the handle 29 is to be associated with the lower part 21.

Across all of the Figures, the locking mechanism is generally described in more detail below. As was explained above, the tool 2 can be driven in both rotation directions, wherein, however, no leak in the food preparation pot 1 is produced when the tool 2 is detached and removed. In an advantageous configuration, a coupling point of the shaft 3 of the lower part 21 to the coupling pin 10 or the bracket 15 of the upper part 22, in particular the positive, non-rotatable connection 17, is disposed within a region which is directly exposed to a prepared food, i.e. comes into contact with the food. Due to this separation, the sealing components, such as the sealing member 18, the lower-part housing 6 and the shaft 3, can remain in the pot bottom 5, whereas the components that make removing the foods difficult, such as the tool 2, can be removed. The shaft 3 is integrated into the pot bottom 5, particularly in the pot through-hole 4, in a rotatably mounted manner by means of the lower-part housing 6, and is coupled, with the coupling end 12, to a drive shaft of the drive comprising an electric motor, when the food preparation pot 1 is inserted. In particular, the tool 2, e.g. in the form of connected knives with blades firmly connected to a bracket 15 and/or the coupling pin 10, is rotatably mounted in the upper-part housing 7, with the above-mentioned rotatable components of the upper part 22, via the coupling pin 10. The upper part 22 is radially and axially secured in the pot bottom 5 by means of the upper-part housing 7. Thus, the knives are retained in the pot bottom 5 and at the same time brought into engagement with the drivable shaft 3 in the pot bottom 5. The upper-part housing 7 does not rotate along, however, the coupling pin 10 with the blades connected to it, does. The upper-part housing 7 can in this case be fixed to the pot bottom 5 in various ways, as is shown by way of example in the Figures. Advantageously, the upper-part housing 7 can be radially secured by a positive fit in the inner contour of the pot bottom 5. It can be axially secured by a disengageable positive fit between movable locking members 8, the upper-part housing 7 and undercut contours in the pot bottom 5 and/or the lower-part housing 6. The locking members 8 can be pushed into a coupling position by the manual force of the hands of the user, and the upper part 22 can be inserted into the pot bottom 5 with the pot through-hole 4 and/or the lower part 21 in order to enable radial securing. In the coupling position, the locking members 8 can be guided past the undercut contour. By lifting the manual force, the locking members 8 can be pushed into the engaging position by spring force and brought into engagement with the undercut contours. Thus, the axial position of the knives can be secured, and the radial positive fit can therefore also be maintained. The pin coupling 10 is radially mounted and axially fixed in the upper-part housing 7 by means of a ball bearing 13. Thus, the position of the pin coupling 10 is completely defined by the fixing of the upper part 22. The transmission of the rotary movement from the shaft 3 onto the pin coupling 10 can be ensured by a positive fit of the two ends connected in a locked manner.

The invention claimed is:

1. A chopping tool assembly configured to be placed in a central hole of a pot bottom of a food preparation appliance, the chopping tool assembly comprising:
   a lower part including a lower-part housing and a shaft rotatably connected to the lower-part housing, wherein a distal end of the shaft is configured to couple to a drive motor to rotate the shaft when the drive motor is activated, wherein the shaft is axially fixed to the lower-part housing, wherein the shaft includes a proximate end opposite the distal end; and
   an upper part including:
      an upper-part housing;
      a coupling pin having a lower end configured to detachably couple to the proximate end of the shaft of the lower part;
      a bracket coupled to the coupling pin; and
      a rotatable tool coupled to the bracket so as to be axially and rotationally fixed relative to the bracket, the rotatable tool including at least one radial tool arm having a blade for chopping a food, wherein the bracket couples the at least one radial tool arm to the coupling pin such that the coupling pin, the bracket, and the rotatable tool form a single movable unit such that the bracket and the at least one radial tool arm remain coupled to and move with the coupling pin in response to the coupling pin being decoupled from the shaft, wherein the lower end of the coupling pin is configured to connect the rotatable tool of the upper part to the shaft, wherein the upper-part housing receives the coupling pin in an axially fixed manner,
   wherein the rotatable tool is rotatably connected in an axially fixed manner to the upper-part housing of the upper part via the coupling pin, and
   wherein the upper part and the lower part are configured to be locked together by a locking mechanism, such that the rotatable tool, via the upper part, is locked to the shaft when the shaft drives the rotatable tool in one of two rotation directions to chop a food.

2. The chopping tool assembly of claim 1, wherein the locking mechanism is configured to selectively lock together the lower part and the upper part.

3. The chopping tool assembly of claim 1, wherein the lower-part housing can be connected to the food preparation pot in an axially fixed manner when the shaft extends through a pot through-hole to seal the pot through-hole and to connect the rotatable tool to the drive.

4. The chopping tool assembly of claim 1, wherein the upper-part housing selectively interlocks with the lower-part housing in an axially fixed and non-rotatable manner.

5. The chopping tool assembly of claim 4, wherein the lower part includes an engaging recess, wherein the upper part includes a movable locking member, and wherein the upper-part housing interlocks with the lower-part housing when the movable locking member engages the engaging recess.

6. The chopping tool assembly of claim 5, wherein the locking member is biased by a spring and the engaging recess is formed by an undercut contour.

7. The chopping tool assembly of claim 6, wherein the locking member engages with the engaging recess when the locking member is manually deflected against the spring bias and is moved into a coupling position relative to the engaging recess and the locking member is moved from the coupling position into an engaging position by the spring bias.

8. The chopping tool assembly of claim 1, wherein the rotatable tool is non-rotatably connected to a coupling pin and the coupling pin is positively connected in a non-rotatable manner to the shaft in order to connect the rotatable tool to the shaft in a locked manner.

9. The chopping tool assembly of claim 1, wherein the lower-part housing of the lower part is selectively fixedly coupled to the food preparation pot.

10. The chopping tool assembly of claim 6, wherein the locking member engages with the engaging recess when the locking member is movably positioned from the coupling position into an engaging position by the spring bias.

11. The chopping tool assembly of claim 8, wherein the rotatable tool being coupled to the shaft in a locked manner includes the rotatable tool being fixedly coupled to the shaft.

12. The chopping tool assembly of claim 1, further comprising the locking mechanism for locking together the upper part and the lower part.

13. The chopping tool assembly of claim 1, further comprising a sealing member configured for axially clamping between the lower part and the pot bottom such that no substance within an interior of the food preparation pot transfers through the pot through-hole toward an exterior of the food preparation pot.

14. The chopping tool assembly of claim 13, wherein the sealing member is arranged on the lower part.

15. The chopping tool assembly of claim 1, wherein the rotatable tool is rotatably connected in an axially fixed manner to the upper-part housing of the upper part by a ball bearing.

16. The chopping tool assembly of claim 1, wherein the shaft is rotatably connected, while being axially fixed, to the lower-part housing of the lower part by a ball bearing.

17. A chopping tool assembly configured to be detachably placed in a central hole of a pot bottom of a food preparation appliance, the tool assembly comprising:
- a lower part including a lower-part housing and a shaft, wherein a distal end of the shaft is configured to couple to a drive motor to rotate the shaft when the drive motor is activated, wherein the shaft is rotatably connected, while being axially fixed, to the lower-part housing by a ball bearing, wherein the shaft includes a proximate end opposite the distal end; and
- an upper part including:
  - an upper-part housing;
  - a coupling pin having a lower end configured to detachably couple to the proximate end of the shaft of the lower part;
  - a bracket coupled to the coupling pin; and
  - a rotatable tool coupled to the bracket so as to be axially and rotationally fixed relative to the bracket, the rotatable tool including at least one radial tool arm having a blade for chopping a food, wherein the bracket couples the at least one radial tool arm to the coupling pin such that the coupling pin, the bracket, and the rotatable tool form a single movable unit such that the bracket and the at least one radial tool arm remain coupled to and move with the coupling pin in response to the coupling pin being decoupled from the shaft, wherein the lower end of the coupling pin is configured to connect the rotatable tool of the upper part to the shaft, wherein the upper-part housing receives the coupling pin in an axially fixed manner, wherein the rotatable tool is rotatably connected in an axially fixed manner to the upper-part housing of the upper part by a ball bearing, wherein the chopping tool assembly further comprises a locking mechanism to lock together the upper part and the lower part such that the rotatable tool, via the upper part, is locked to the shaft when the shaft drives the rotatable tool in one of two rotation directions to chop a food, and wherein the lower part further comprises a sealing member configured to be axially clamped between the lower part and a pot bottom of a food preparation appliance.

* * * * *